(12) United States Patent
Satou et al.

(10) Patent No.: US 7,319,816 B2
(45) Date of Patent: Jan. 15, 2008

(54) DETECTION OF DISCONNECTION IN AN OPTICAL TRANSMISSION LINE

(75) Inventors: Tsutomu Satou, Sagamihara (JP); Kenji Ota, Ota (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 10/777,706

(22) Filed: Feb. 13, 2004

(65) Prior Publication Data

US 2004/0190897 A1   Sep. 30, 2004

(30) Foreign Application Priority Data

Mar. 31, 2003   (JP)   ............................. 2003-097475

(51) Int. Cl.
*H04B 10/08* (2006.01)
*H04B 17/00* (2006.01)
(52) U.S. Cl. ...................................... 398/21
(58) Field of Classification Search .............. 398/10, 398/13, 15, 17, 20, 21
See application file for complete search history.

(56) References Cited

U.S. PATENT DOCUMENTS 5,673,351 A   9/1997   Clarke et al. ............... 385/100
5,767,956 A * 6/1998   Yoshida ...................... 356/73.1
5,959,293 A   9/1999   Ishikawa ................. 250/227.14
7,127,182 B2 * 10/2006   Matthews et al. ........... 398/183

FOREIGN PATENT DOCUMENTS

| DE | 19830729 A1 | 1/2000 |
| EP | 0437162 A2 | 7/1991 |
| EP | 0772265 A1 | 5/1997 |
| JP | 05-034529 | 2/1993 |

OTHER PUBLICATIONS

K. Shimizu et al., "Coherent Self-Heterodyne Brillouin OTDR for Measurement of Brillouin Frequency Shift Distribution in Optical Fibers", Journal of Lightwave Technology, vol. 12, No. 5, May 1994.*

* cited by examiner

*Primary Examiner*—Shi K Li
(74) *Attorney, Agent, or Firm*—Staas & Halsey LLP

(57) ABSTRACT

An optical transmitter transmits a light which alternately exhibits a spectrum line width wider than a Brillouin bandwidth and a spectrum line width narrower than the Brillouin bandwidth. The transmitted light is provided to an optical transmission line so that the transmitted light travels in the transmission line and thereby causes returning light to be generated in the transmission line. An optical detecting section detects the returning light. Disconnection of the transmission line is detected from the detected returning light.

13 Claims, 10 Drawing Sheets

1 div. : 100ms

DETECTION OF DISCONNECTION IN AN OPTICAL TRANSMISSION LINE

CROSS-REFERENCE TO RELATED APPLICATIONS

The present application claims priority to Japanese application 2003-097475, filed Mar. 31, 2003, which is incorporated herein by reference.

BACKGROUND OF THE INVENTION

1. Field of the Invention

The present invention relates to the detection of a disconnection in an optical transmission line. More particularly, the present invention relates to the use of Brillouin scattering to detect a disconnection in an optical transmission line.

2. Description of the Related Art

With the progression of optical communication systems, optical output power of optical transmission apparatuses is increasing as a result of, for example, an increase of transmission distance.

Accordingly, if a worker erroneously cuts an optical fiber or, for example, opens an optical connector while light is being transmitted, the light may radiate from the cut fiber or opened connector at a dangerously high intensity. Therefore, it is being requested that optical transmission apparatuses provide a monitoring mechanism to suspend or reduce optical output by detecting disconnection of the transmission line due to cutting of an optical fiber or opening of an optical connector or similar device.

Standards such as IEC (International Electrotechnical Commission) and JIS (Japanese Industrial Standard) specify regulations to be observed by a monitoring mechanism in order to attain the safety of workers for maintenance and repair when an optical fiber is disconnected. The regulations relate to, for example, detection of a failure, transition to a failure condition, halting/reducing pump light or intermitted generation of pumped light upon detection of a failure, and recovery after the failure.

Fresnel reflection is conventionally used by a monitoring mechanism in an optical transmission apparatus to detect disconnection of the transmission line.

For example, FIG. 1 is a diagram illustrating a conventional optical transmission apparatus having a monitoring mechanism for detecting disconnection of a transmission line, and which is based on Fresnel reflection. An optical transmission apparatus using Fresnel reflection, such as that in FIG. 1, can be understood from Japanese Laid-Open Publication No. 3-034529.

Referring now to FIG. 1, an optical transmission apparatus 1B comprises an optical amplifying/controlling section 4A and a Fresnel reflection light detecting section 5A. Optical amplifying/controlling section 4A comprises an optical amplifying section 17A, an optical variable attenuating section 16A, a coupler 19C, a photodiode (PD) 11B, a signal detecting section 15B and a control section (CTRL) 18A. Moreover, light detecting section 5A comprises a coupler 19D, a photodiode (PD) 11D, and a signal detecting section 15D. Intensity of the light output from optical amplifying/controlling section 4A can be varied by controlling gain of optical amplifying section 17A or attenuation of optical variable attenuating section 16A.

When an optical fiber of the transmission line is broken or an optical connector is opened, the core of optical fiber is exposed to the air and change is thereby occurred in refractive index of medium in which the light is transmitted. Accordingly, reflection of light (Fresnel reflection) is generated. When disconnection such as break of an optical fiber is generated in the transmission line to which the light is output from optical transmission apparatus 1B, signal light transmitted from optical amplifying/controlling section 4A and output light, such as monitoring control light, are partly reflected at the disconnection point with the Fresnel reflection and are then returned to optical transmission apparatus 1B.

The returning light on the transmission line output from optical transmission apparatus 1B is partly branched with coupler 19D of light detecting section 5A, converted to an electrical signal with photodiode 11D and signal detecting section 15D, and is then transferred to control section 18A.

If disconnection is generated in the transmission line, intensity of the returning light to optical transmission apparatus 1B increases due to the Fresnel reflection. Therefore, disconnection of the transmission line can be determined by detecting that intensity of the returning light exceeds a breaking threshold value. When disconnection of the transmission line is determined, optical transmission apparatus 1B maintains an output thereof within a safety standard (hereinafter referred to as a "safe light condition") through reduction of the gain of optical amplifying section 17A or increase of attenuation of optical variable attenuating section 16A.

If the transmission line is in the disconnected condition, Fresnel reflection is also generated due to the light output within a range of the safety standard. Therefore, disconnection and recovery of transmission line can be determined even within the safe light condition. When disconnection of the transmission line is recovered, the returning light to optical transmission apparatus 1B due to the Fresnel reflection disappears. Accordingly, recovery of disconnection of the transmission line can be determined by detecting that intensity of the returning light is reduced to less than a certain breaking threshold value. When recovery of disconnection of the transmission line is determined, optical transmission apparatus 1B returns to the operation of providing ordinary output by resetting the gain of optical amplifying section 17A and attenuation of optical variable attenuating section 16A.

The above-described manner of detecting disconnection of the transmission line is based on the detection of Fresnel reflection at the disconnection point. However, intensity of the returning light due to the Fresnel reflection varies depending on conditions of the disconnection point. For example, amount of returning light due to the Fresnel reflection generated when an APC (Angled Physical Contact) connector formed in the structure to reduce the returning light by forming angled polishing surface is opened becomes smaller than the amount of the returning light due to the Fresnel reflection generated when a different type of connector (for example, a PC (Physical Contact)) connector is opened.

Moreover, even when an optical fiber is broken, the amount of returning light due to the Fresnel reflection is different to a large extent depending on the condition of the cutting surface. Accordingly, it is also probable that disconnection of the transmission line cannot be detected only with detection of increase in amount of the returning light due to the Fresnel reflection.

Further, since intensity of the light transmitted to the transmission line in the safe light condition is rather low, if amount of the returning light due to the Fresnel reflection is small, it becomes difficult, in some cases, to determine the recovery of disconnection due to disappearance of the Fresnel reflection even when the safe light condition can be set through detection of the Fresnel reflection.

There are other mechanisms for detecting a disconnection of the transmission line. For example, a monitoring control signal can be transmitted to an optical transmission apparatus from a downstream apparatus in the reverse direction of the transmission line. In accordance with detection of the monitoring control signal by the optical transmission apparatus, an output of signal light from the optical transmission apparatus can be kept within the safety standard by detecting disconnection of the transmission line in the downstream side. However, with this type of monitoring mechanism, it is impossible to directly perform control such as suspension of output and stoppage of output of the light transmitted from the down-stream station.

Other manners of detecting disconnection of the transmission line include using information obtained from an opposite transmission line to detect disconnection.

SUMMARY OF THE INVENTION

The present invention relates to an improved manner of detecting disconnection of a transmission line.

Additional objects and advantages of the invention will be set forth in part in the description which follows and, in part, will be obvious from the description, or may be learned by practice of the invention.

The present invention provides a detector detecting disconnection in an optical transmission line in accordance with Brillouin scattering occurring in the transmission line. Similarly, the present invention provides a method which detects disconnection in an optical transmission line in accordance with Brillouin scattering occurring in the transmission line.

The present invention also provides an apparatus including (a) a transmitter transmitting light which is provided to, and travels in, an optical transmission line, the transmitted light causing Brillouin scattering to occur in the transmission line, the Brillouin scattering thereby causing returning light to travel in the transmission line in a reverse direction than the light transmitted by the transmitter; and (b) a detector detecting the returning light, and detecting disconnection in the transmission line in accordance with the detected returning light.

The present invention provides an apparatus including (a) an optical transmitter transmitting a light which alternately exhibits a spectrum line width wider than a Brillouin bandwidth and a spectrum line width narrower than the Brillouin bandwidth, the transmitted light provided to an optical transmission line so that the transmitted light travels in the transmission line and thereby causes returning light to be generated in the transmission line; and (b) an optical detecting section detecting the returning light, wherein disconnection of the transmission line is detected from the detected returning light.

The present invention also provides a method including (a) transmitting a light in an optical transmission line, the transmitted light causing Brillouin scattering to occur in the transmission line which thereby causes a returning light to travel in the transmission line in an opposite direction than the transmitted light; (b) detecting the returning light; and (c) detecting disconnection of the transmission line in accordance with the detected returning light.

The present invention provides a method including (a) transmitting a light in an optical transmission line, the transmitted light causing a returning light having a Stokes component to travel in the transmission line in an opposite direction than the transmitted light; (b) detecting the returning light; and (c) detecting disconnection of the transmission line in accordance with the Stokes component of the detected returning light.

Further, the present invention provides a method including (a) transmitting a light in an optical transmission line, the transmitted light causing Brillouin scattering to occur in the transmission line which thereby causes a returning light having a low frequency component to occur in the transmission line and to travel in the transmission line in an opposite direction than the transmitted light; (b) detecting the returning light; and (c) detecting disconnection of the transmission line in accordance with the low frequency component of the detected returning light.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE EMBODIMENTS

Figure 1:
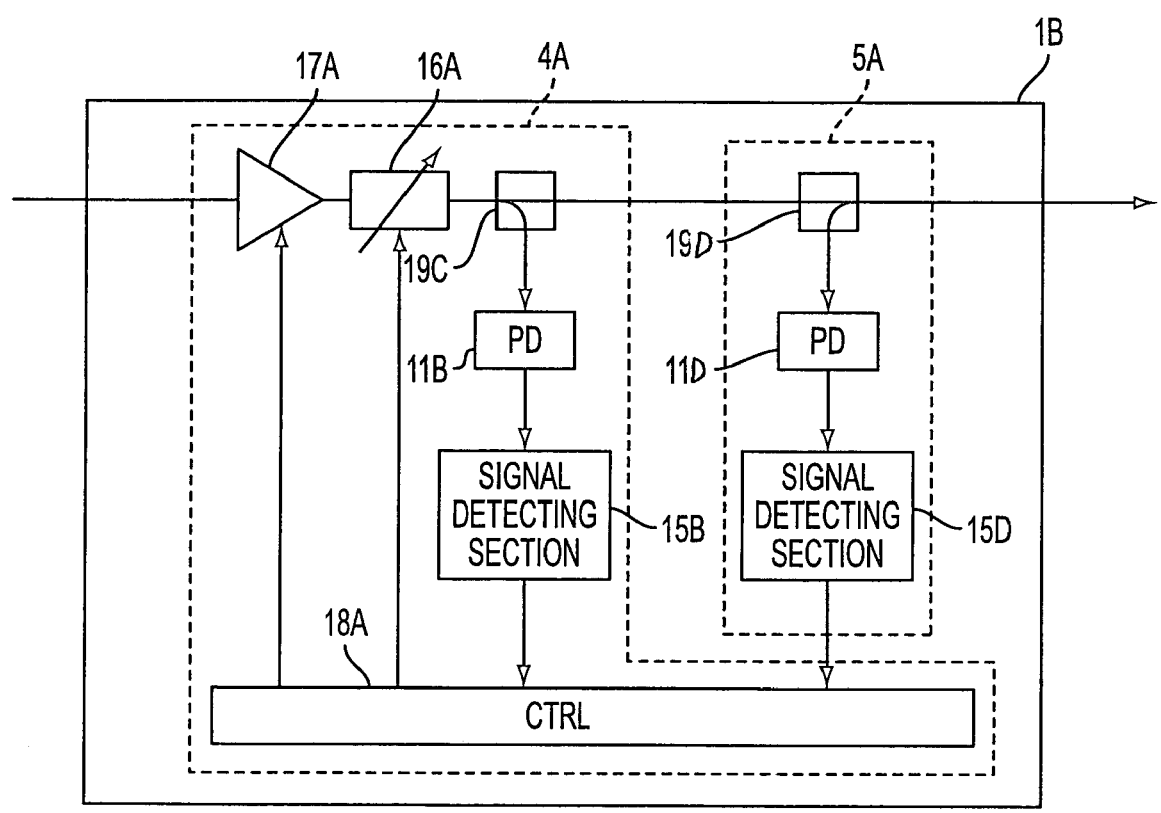
FIG. 1 (prior art) is a diagram illustrating a conventional optical transmission apparatus.

Reference will now be made in detail to the present preferred embodiments of the present invention, examples of which are illustrated in the accompanying drawings, wherein like reference numerals refer to like elements throughout.

Figure 2:
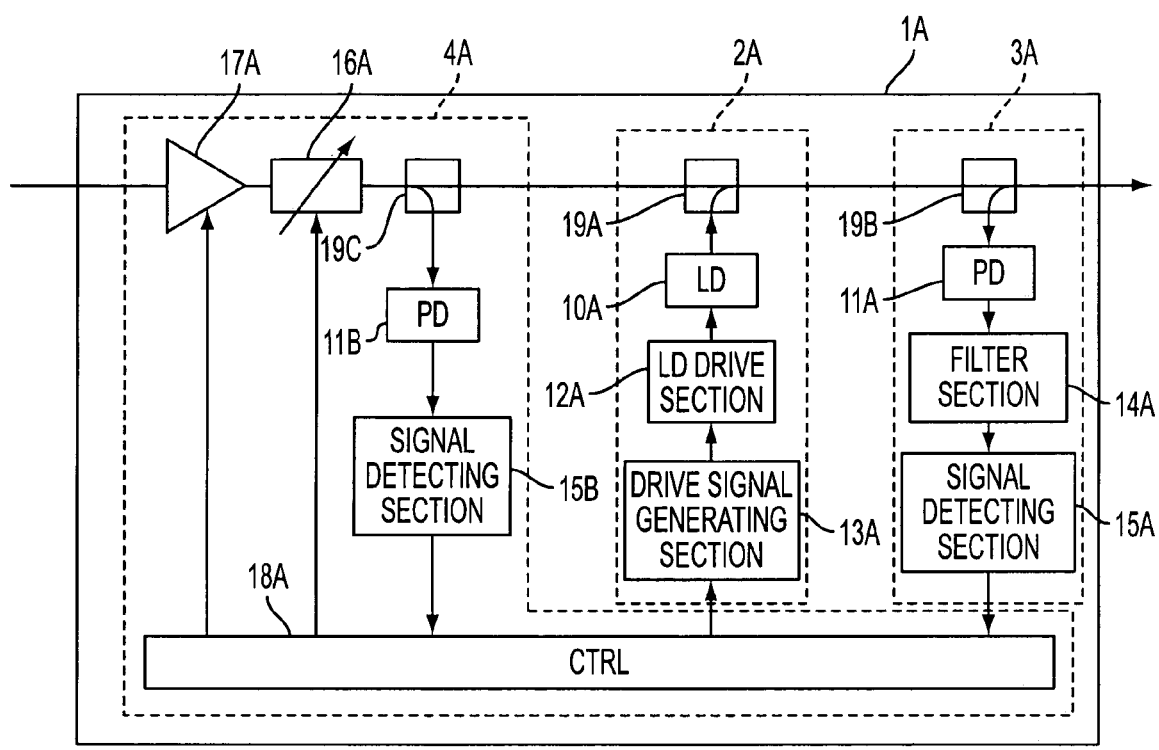
FIG. 2 is a diagram illustrating an optical transmission apparatus of the present invention.

FIG. 2 is a diagram illustrating an optical transmission apparatus according to an embodiment of the present invention. Referring now to FIG. 2, an optical transmission apparatus 1A comprises a detected light transmitter 2A, a returning light detecting section 3A and an optical amplifying/controlling section 4A. Detected light transmitter 2A comprises a coupler 19A, a laser diode (LD) 10A, an LD drive section 12A, and a drive signal generating section 13A. Returning light detecting section 3A comprises a coupler 19B, a photodiode (PD) 11A, a filter section 14A, and a signal detecting section 15A. Optical amplifying/controlling section 4A comprises an optical amplifying section 17A, an optical variable attenuating section 16A, a coupler 19C, a photodiode (PD) 11B, a signal detecting section 15B, and a control section 18A.

The optical transmission apparatus of the present invention transmits a detection light to a transmission line and detects disconnection of the transmission line with the scattering light due to stimulated Brillouin scattering (SBS) included in the returning light. SBS is the non-linear optical phenomenon generated when coherent light (pumping light) propagated in the optical fiber excites acoustic phonon in the optical fiber and the scattering light due to the SBS (Stokes light) is generated in the maximum intensity in the reverse direction to the transmitting direction of the pumping light. Therefore, when the detection light is transmitted to the transmission line and the SBS is generated, Stokes light is detected in the returning light.

From the point of view of the optical spectrum, the SBS is generated in considerable intensity when intensity of the pumping light in the constant bandwidth (Brillouin bandwidth) exceeds the particular value. Therefore, when the returning light is observed by increasing intensity of the light input to the optical fiber, the returning light due to the Rayleigh scattering and Fresnel scattering increases in proportion to intensity of the incident light. The returning light due to the SBS is added when intensity reaches a certain value (hereinafter, this value is referred to as the SBS threshold value).

When the spectrum width of the optical spectrum is extended wider than the Brillouin bandwidth, intensity of the pumping light in the Brillouin bandwidth is relatively reduced and thereby the SBS threshold value increases. Accordingly, generation of the SBS can be suppressed by widening the spectrum width of the pumping light.

Figure 3:
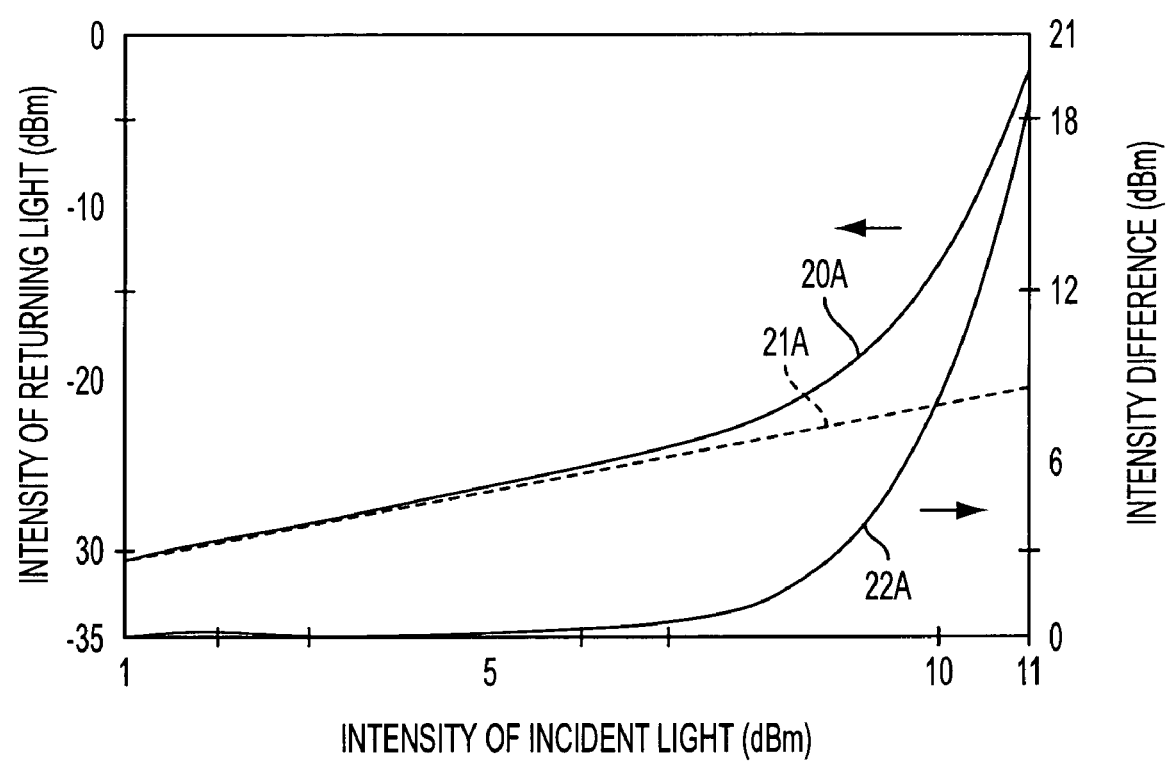
FIG. 3 is a diagram illustrating intensity of SBS returning light depending on modulation and non-modulation of incident light to the transmission line.

FIG. 3 is a diagram illustrating changes (left axis) of intensity of the returning light when intensity of the incident light is increased, according to an embodiment of the present invention. More specifically, FIG. 3 illustrates a first returning light 20A when the spectrum width of the incident light is widened, and a second returning light 21A when the spectrum width of the incident light is not widened. Intensity difference (right axis) between the first returning light and the second returning light is illustrated as 22A.

When intensity of the incident light is increased, the returning light due to the Rayleigh scattering and Fresnel scattering increases in proportion to intensity of the incident light. When intensity of the incident light is low, intensity difference is not generated between the first returning light 20A and the second returning light 21A. When intensity of the incident light exceeds the SBS threshold value (for example, 5 dBm), the Stokes light due to the SBS is added to the first returning light 20A but the SBS is suppressed in the second returning light 21A having widened spectrum width. Therefore, the Stokes light due to the SBS is suppressed and not added to the second returning light 21A. Accordingly, with increase of intensity of the incident light, intensity difference 22A between the first returning light 20A and the second returning light 21A increases non-linearly. Intensity of the scattering light due to the SBS can be detected by setting the incident light to the intensity which results in intensity difference between the first returning light 20A and the second returning light 21A.

The present invention utilizes the phenomenon, illustrated in FIG. 3, which suppresses generation of the SBS when the spectrum width of the incident light is widened. According to an embodiment of the present invention, spectrum width of output light of the LD is widened by modulating the drive current of the LD. In FIG. 2, wavelength and spectrum of the light transmitted from LD 10A are changed depending on the drive current by LD drive section 12A. Drive signal generating section 13A alternately outputs the modulated signal and the non-modulated signal to change the drive current of LD drive section 12A. Modulation of signal by drive signal generating section 13A is performed with the signal frequency which makes the spectrum of output light from the LD wider than the Brillouin bandwidth and the signal frequency is determined with the characteristic of LD and the Brillouin bandwidth.

With the drive current of LD drive section 12A, the light of which spectrum line width is wider than the Brillouin bandwidth and the light of which spectrum line width is narrower than the Brillouin bandwidth are periodically transmitted by LD 10A and output to the transmission line through coupler 19A. The SBS is generated when intensity of pumping light in the Brillouin bandwidth exceeds the particular value not depending on the wavelength. Therefore, wavelength of output light from LD 10A can be selected freely.

Here, the returning light due to the SBS can be used for detection of disconnection of the transmission line. By setting the wavelength of the output light from LD 10A to the outside of the bandwidth in order to prevent mutual effect for the signal light, the detection can be done without any interference on the communication of the signal light. Moreover, by setting the intensity of the output light of LD 10A to, for example, 10 dBm or less in order to satisfy the safety standard about the radiation of light to the outside of the fiber due to break and open connector or the like of the optical fiber, the signal is output from LD 10A, not only during the ordinary operating condition but also under the safe light condition after detection of disconnection of the transmission line, without any interference on the communication.

Returning light detecting section 3A inputs an output light of detection light transmitter 2A output to the transmission line and the returning light of the signal light, and detects disconnection of the transmission line from the Stoke light component of the returning light. A part of the returning light from the transmission line input from coupler 19B is input to PD 11A, converted to an electrical signal and is then input to signal detecting section 15A via filter section 14A. In FIG. 3, since the light which alternately exhibits the light of the spectrum line width which is wider than the Brillouin bandwidth and the light of the spectrum line width which is narrower than the Brillouin bandwidth is transmitted periodically from detection light transmitter 2A in FIG. 2 in intensity of the incident light to provide intensity difference between the first returning light 20A and the second returning light 21A, the returning light including the Stokes light due to the SBS and the returning light not including the Stokes light are alternately input to returning light detecting section 3A. Accordingly, the generating situation of the SBS in the transmission line can be detected by detecting such condition with signal detecting section 15A through PD 11A and filter section 14A.

Intensity of the light input to the transmission line from LD 10A is the intensity of incident light which results in intensity difference, shown in FIG. 3, between the first returning light 20A and the second returning light 21A and is set to, for example, 10 dBm or less to satisfy the safety standard.

Figure 4:
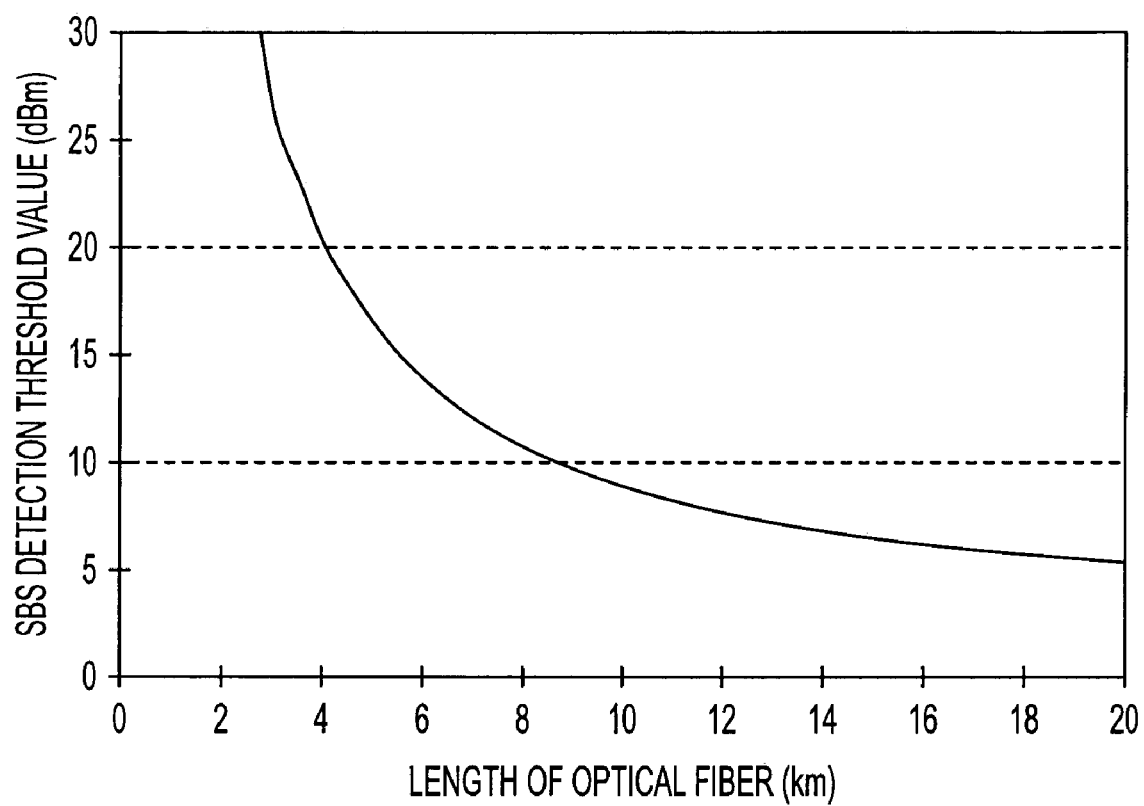
FIG. 4 is a diagram illustrating relationship between intensity of incident light to the transmission line and length of optical fiber in which disconnection can be detected.

FIG. 4 illustrates the relationship between intensity of detected light (SBS threshold value) and length of fiber. The SBS can be generated easier as the optical fiber of the transmission line is longer. Moreover, this SBS is also generated easier as the input power of the optical fiber is more coherent and higher. Even if the transmission line is disconnected at a point A (not shown), when the point A is isolated from the optical transmission apparatus 1A by a distance which is longer than a predetermined distance, the SBS is generated continuously without relation to disconnection of the transmission line and disconnection of the transmission line cannot be detected. Accordingly, it is certain that the distance of the point A in which disconnection of the transmission line cannot be detected surely exists. From FIG. 4, when intensity of the output light is about 10 dBm, disconnection of transmission line within the distance up to about 8 km can be detected.

When returning light detecting section 3A detects disconnection of the transmission line, the gain of optical amplifying section 17A or the attenuation of optical variable attenuating section 16A are controlled through control section 18A and the operating condition is shifted to the safe light condition wherein intensity of the light transmitted to the transmission line is kept within the safety standard. Even in the safe light condition, the optical signal is still output from LD 10A and returning light detecting section 3A can also detect the SBS generating condition in the transmission line as in the case of the ordinary operating condition. Therefore, recovery from the disconnection can be detected as in the case of the detection of disconnection of the transmission line.

Figure 5:
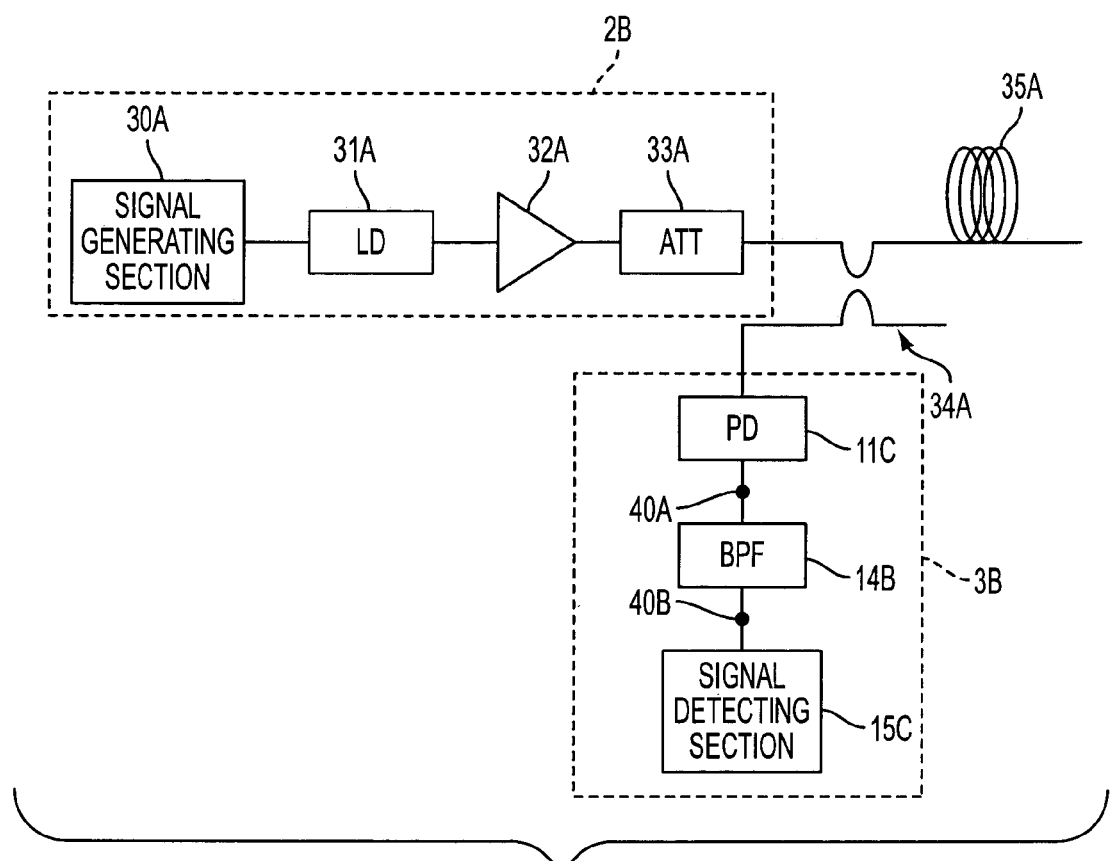
FIG. 5 is a diagram illustrating a structure for testing the present invention.

Next, practical procedures for detecting disconnection of the transmission line based on the principle described above will be described with reference to the results of experiment under the structure illustrated in FIG. 5. In FIG. 5, detection light transmitter 2B comprises a signal generating section 30A, a laser diode (LD) section 31A, an optical amplifier 32A, and an optical attenuator 33A. Moreover, returning light detecting section 3B comprises a photodiode (PD) 11C, a filter section (BPF) 14B, and a signal detecting section 15C. The light from detection light transmitter 2B is input to optical fiber 35A and the returning light from optical fiber 35A is input to returning light detecting section 3B through coupler 34A.

Figure 6A:
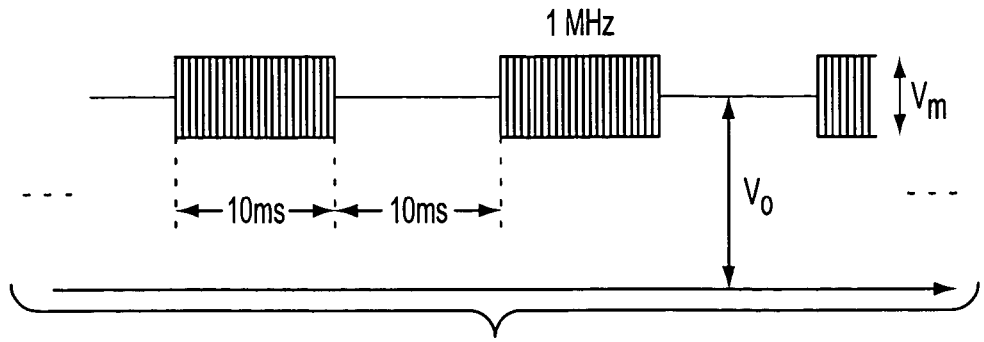
FIGS. 6(A)-6(D) are diagrams illustrating modulating condition of incident light to the transmission line and returning light.

Detection of the scattering light due to the SBS under the ordinary condition will then be described. FIG. 6(A) illustrates the signal input to LD section 31A from signal generating section 30A. In this figure, the non-modulated signal 10 ms and the modulated signal 10 ms (10000 cycles) modulated with 1 MHz are input. Since optical spectrum of the output light of LD section 31A exceeds the Brillouin bandwidth by inputting the signal modulated with 1 MHz to LD section 31A, generation of the SBS can be suppressed.

Figure 6B:
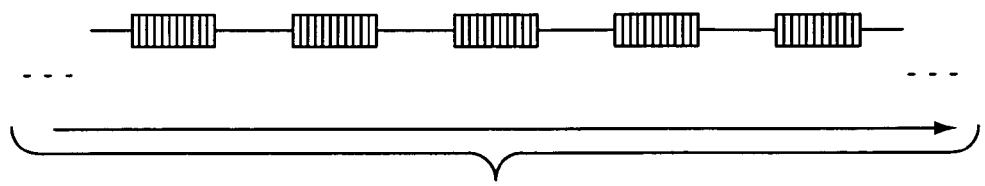
Figure 6C:
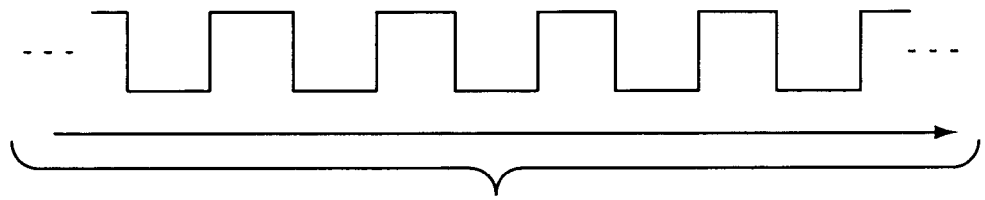

FIGS. 6(B) and 6(C) schematically illustrate an input signal light to LD section 31A and a detection signal of optical detecting section 3B corresponding to this input signal light. In FIG. 6(B), when the modulated signal is input to LD section 31A, since the spectrum of the light output from detection light transmitter 2B exceeds the Brillouin bandwidth, generation of the SBS can be suppressed. Accordingly, the returning light input to returning light detecting section 3B does not include the scattering light due to the SBS. Meanwhile, since generation of the SBS is not suppressed when the non-modulated signal is input to LD section 31A, the scattering light due to the SBS is included in the returning light input to returning light detecting section 3B and signal intensity of the detection signal of returning light detecting section 3B becomes higher than intensity when the returning light due to the modulated signal is detected.

Figure 6D:
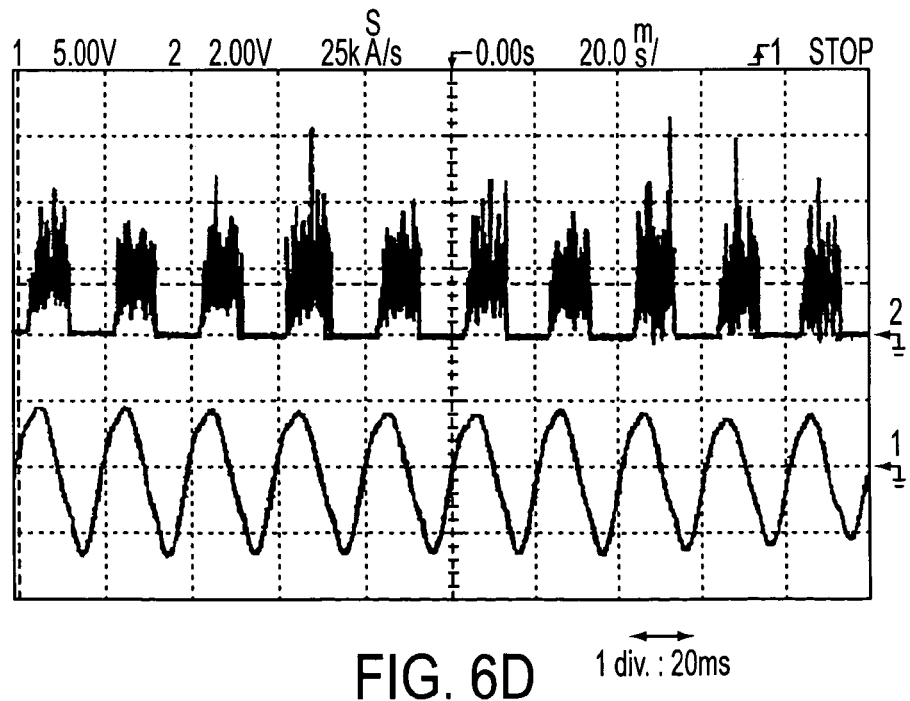

The upper waveform of FIG. 6(D) illustrates a voltage at a measuring point 40A of FIG. 5 which is an output of PD 11C, while the lower waveform thereof is a voltage at a measuring point 40B which is an output of filter 14B. One division of graduation in this figure indicates 20 ms. As illustrated as the upper waveform of FIG. 6(D), an output of PD 11C shows the large and small inputs in the period of 20 ms. When the signal is output using a peak detection circuit or similar device as filter section 14B, the detection signal shows high and low amplitudes in the period of 20 ms as illustrated as the lower waveform of FIG. 6(D).

As described above, the scattering light due to the SBS can be detected by alternately inputting the modulated signal and non-modulated signal to LD section 31A.

Next, the signal detected by returning light detecting section 3B when the transmission line is disconnected and the method of detecting disconnection of transmission line will then be described.

Figure 7:
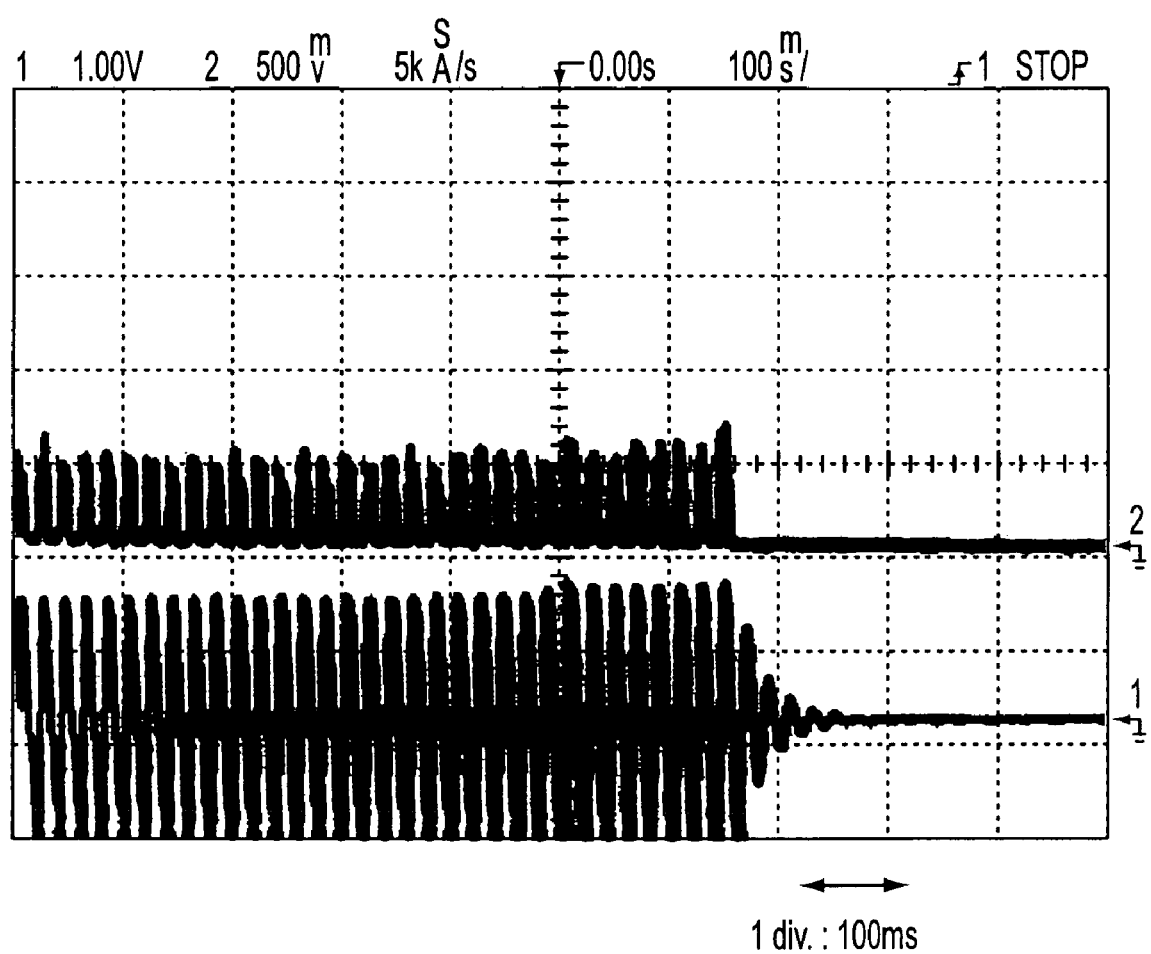
FIG. 7 is a diagram illustrating changes of returning light when disconnection is generated.

FIG. 7 is a diagram illustrating results of observation in returning light detecting section 3B when the APC (Angled Physical Contact) connector (not illustrated) providing less amount of reflection is connected to optical fiber 35A and is then opened in the course of operation. Like the upper waveform of FIG. 6(D), the upper waveform illustrates a voltage at the measuring point 40A of FIG. 5 as the output of PD 11C, while the lower waveform illustrates a voltage at the measuring point 40B as the output of filter 14B. One division of graduation in this figure indicates 100 ms. In FIG. 7, the connector is opened in the timing where the upper waveform signal disappears, but after disconnection is generated due to the opening of connector, the detected signal of the returning light detecting section is responded within 100 ms.

Figure 8A:
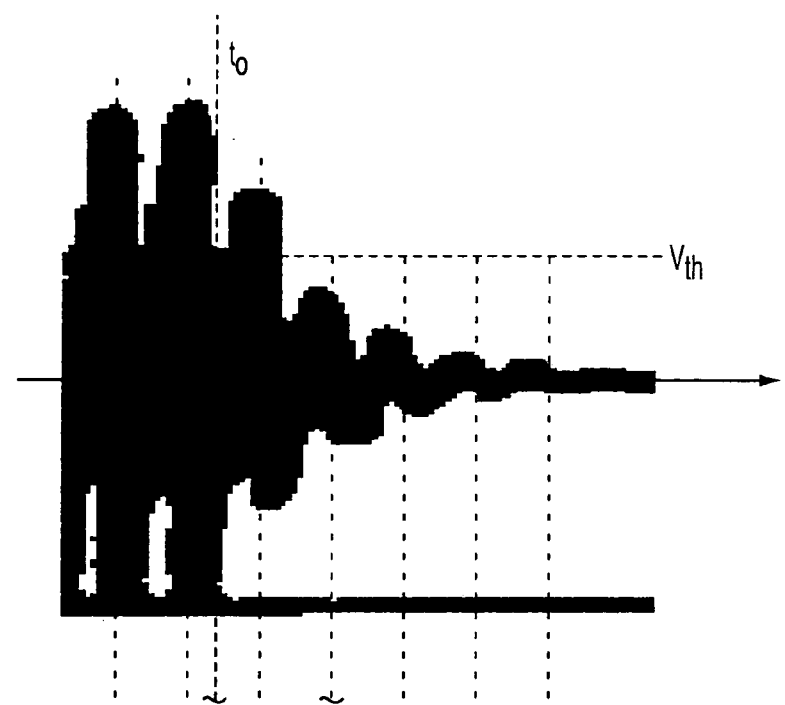
FIGS. 8(A)-8(D) are diagrams illustrating returning light when disconnection is generated, and control of an optical transmission apparatus.
Figure 8B:
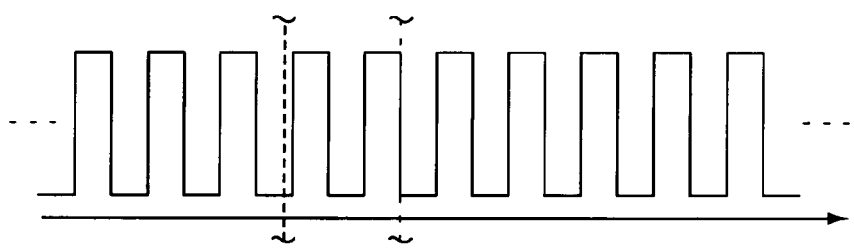

FIGS. 8(A) and 8(B) include the waveform obtained by expanding the lower waveform of FIG. 7 and the waveform illustrating the relationship between changes of signal intensity and control of the optical transmission apparatus of the present invention. Particularly, FIG. 8(A) is the expanded illustration of changes of the lower waveform of FIG. 7 when the upper signal output waveform of FIG. 7 disappears due to the opening of connector. When the connector is opened at the time $t_o$ and the transmission line is disconnected, an output of the PD as the upper waveform of FIG. 7 is rapidly reduced and thereby an output of the lower waveform of FIG. 7 from filter 14B is also reduced.

Here, the optical transmission apparatus of the present invention can transit to the safe light condition within a short period of time from disconnection (time $t_o$) of the transmission line by utilizing a threshold voltage $V_{th}$ of signal detecting section 15C and the modulated/non-modulated clock signal of signal generating section 30A. The upper waveform of FIG. 8(B) is the modulated/non-modulated clock signal of signal generating section 30A, while the intermediate part thereof illustrates the condition of the transmission line and the lower part thereof illustrates the condition of the optical transmission apparatus.

In FIG. 8(A), when the transmission line is disconnected with the opening of connector at the time $t_0$, an output of filter 14B is rapidly reduced. Signal detecting section 15C monitors whether signal intensity exceeds the threshold voltage Vth or not within one period of the clock signal illustrated as the upper waveform of FIG. 8(B) and also notifies disconnection of the transmission line to an external control mechanism when one period of the clock signal has passed (time $t_0+T_s$), while signal intensity does not exceed the threshold voltage.

Figure 8C:
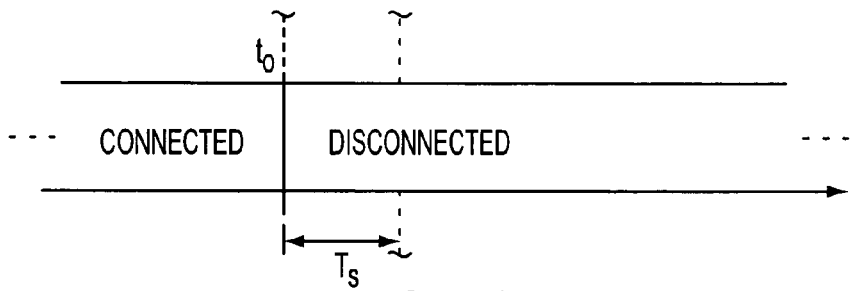
Figure 8D:
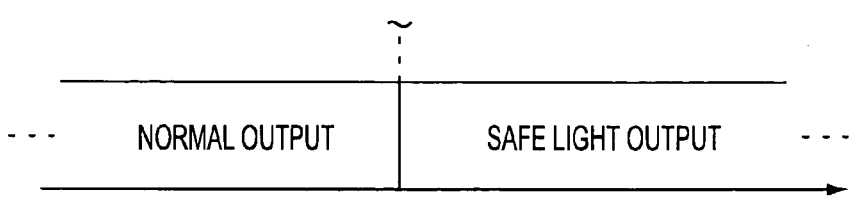

The optical transmission apparatus of the present invention is capable of shifting to the safety condition, as described above, within the short period Ts (see FIG. 8(C))

from occurrence of disconnection of the transmission line (time $t_0$). As illustrated in FIG. 8(D), the optical transmission apparatus illustrated in FIG. 2 shifts, when returning light detecting section 3A detects disconnection of the transmission line, to the safe light condition by controlling amount of amplification of optical amplifying section 17A and amount of attenuation of optical variable attenuating section 16A with control section 18A.

Figure 9:
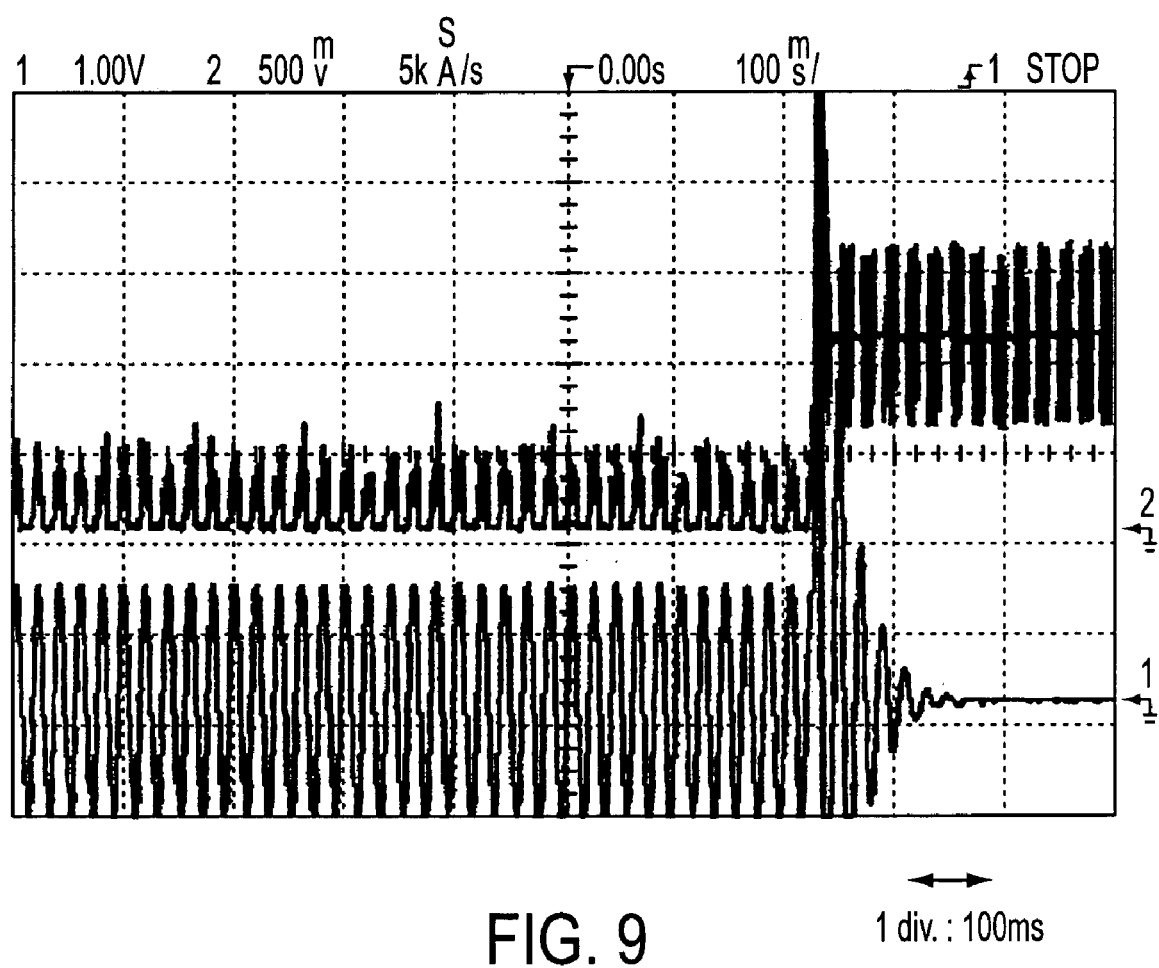
FIG. 9 is a diagram illustrating changes of returning light when disconnection is generated.

FIG. 9 illustrates results of measurement in returning light detecting section 3B when the PC (Physical Contact) connector (not illustrated) is connected to optical fiber 35A and is then opened in the course of operation under the structure illustrated in FIG. 5. As in the case of FIG. 7, the upper waveform illustrates a voltage at the measuring point 40A of FIG. 5 as an output of PD 11C, while the lower waveform illustrates a voltage at the measuring point 40B of FIG. 5 as an output of filter 14B. One division of graduation in the figure indicates 100 ms.

The output voltage of PD 11C illustrated as the upper waveform in FIG. 9 is increased rapidly when the connector is opened due to the Fresnel reflection of the PC connector but the input voltage of signal detecting section 15C illustrated as the lower waveform in FIG. 9 is rapidly attenuated like the lower waveform in FIG. 7. Accordingly, the operating condition can be shifted to the safety condition within a short period with the method of detecting disconnection of transmission line as illustrated in FIG. 8.

As described above, the transmission line disconnection detecting method and apparatus of the present invention can detect disconnection of the transmission line not only when the Fresnel reflection illustrated in FIG. 9 is returned to a large extent but also when the Fresnel reflection illustrated in FIG. 7 is barely returned.

The condition for determining shift of the operating condition to the safe light condition described above is only an example and the condition of the signal input to signal detecting section 15C and the condition of clock used for synchronization or the like can be determined freely.

In an additional embodiment of the present invention, as described below, existence of the Stokes light due to the SBS included in the returning light from the transmission line is detected by utilizing optical spectrum or distribution of output signal frequency of the PD.

Figure 10A:
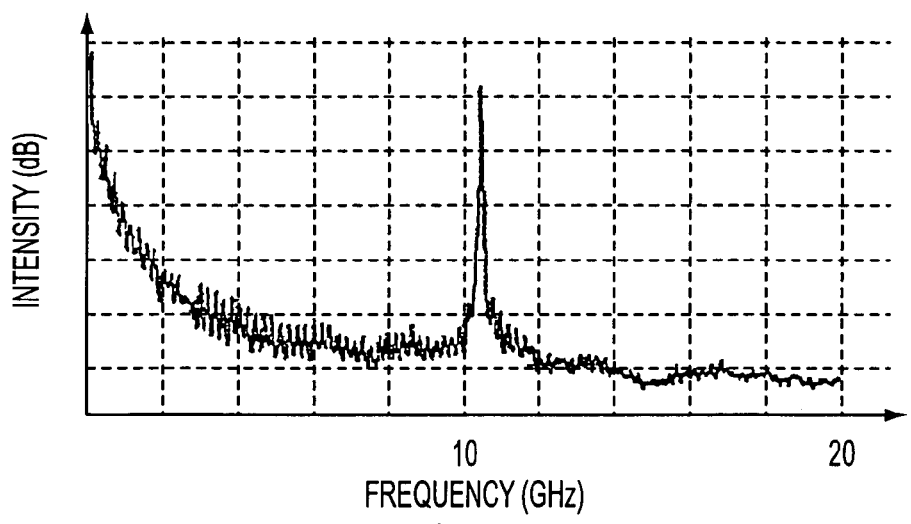
FIGS. 10(A)-10(C) are diagrams illustrating spectrum of SBS and spectrum of a receiving signal of returning light.

More specifically, FIG. 10(A) illustrates optical spectrum of the Stokes light having the sharp peak at the frequency of about 10 GHz. When the Stokes light is generated due to the SBS, the component having the sharp peak at the frequency of about 10 GHz is detected in the optical spectrum of the returning light. Accordingly, when returning light detecting section 3A of FIG. 2 includes a mechanism for measuring optical spectrum, generation of the SBS can be detected by measuring the peak of the spectrum at the frequency of about 10 GHz.

Figure 10B:
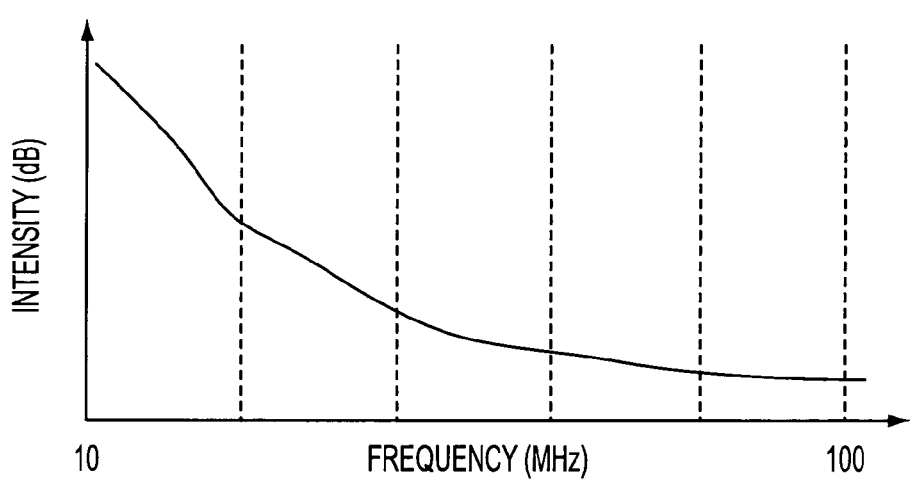
Figure 10C:
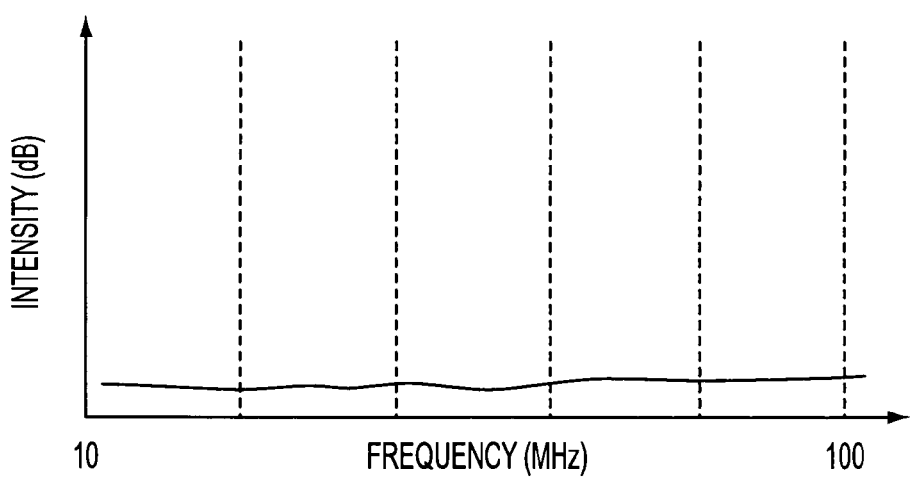

Moreover, FIG. 10(B) and FIG. 10(C) illustrate an output signal of the PD with the frequency plotted on the horizontal axis. Particularly, FIG. 10(B) illustrates frequency distribution when the Stokes light is included in the returning light, while FIG. 10(C) illustrates frequency distribution when the Stokes light is not included in the returning light. As illustrated in FIG. 10(B), since the low frequency component increases when the Stokes light is generated due to the SBS, generation of the SBS can be detected by detecting such increase of the low frequency component. As in the case of other embodiments of the present invention described herein, disconnection of the transmission line can be detected from intensity of the returning light due to the SBS by detecting, in FIG. 2, intensity of the low frequency component with signal detecting section 15A under the assumption that filter 14A of returning light detecting section 3A outputs only the low frequency component.

Unlike various other embodiments of the present invention described herein, in the present embodiment, it is not always necessary that an output of drive signal generating section 13A be modulated. Moreover, since it is possible to use in parallel the detecting methods of the present embodiment and other embodiments described herein, detection of the low frequency component and detection of periodical variation of the returning light due to the supply of the modulated/non-modulated drive signal, for example, can be used in parallel.

As described above, according to the present invention, disconnection of the transmission line can be detected by detecting the Stokes light due to the stimulated Brillouin scattering. Since the disconnection detection does not depend, for example, on the amount of reflection at the disconnecting point, the shape of connector or the shape of cutting surface of the optical fiber used in the transmission line, disconnection of the transmission line can be detected more reliably.

Moreover, since recovery of disconnection can be detected by transmitting, after generation of disconnection, the light to the transmission line with the output satisfying the safety standard, an output of the optical transmission apparatus can be controlled automatically depending on generation of disconnection of the transmission line and recovery thereof.

The present invention provides (a) an optical transmitter for periodically transmitting the light which alternately exhibits the light of spectrum line width which is wider than the Brillouin bandwidth and the light of spectrum line width which is narrower than the Brillouin bandwidth, and (b) an optical detecting section for detecting the returning light transmitted from the optical transmitter with the transmission line, in view of detecting disconnection of the transmission line based on the information of the returning light detected with the optical detecting section.

Since the stimulated Brillouin scattering is suppressed by the light of which spectrum line width is wider than the Brillouin bandwidth, the intensity of returning light differ between the light of which the spectrum line width is wider than the Brillouin bandwidth and the light of which the spectrum line width is narrower than the Brillouin bandwidth. Therefore, the component of stimulated Brillouin scattering can be detected from the returning light. When the transmission line is disconnected, the amount of the returning light due to the stimulated Brillouin scattering is reduced. Accordingly, disconnection of the transmission line can be detected.

The present invention also provides (a) an optical transmitter and (b) an optical detecting section for detecting, from a transmission line, returning light transmitted from the optical transmitter, in view of detecting disconnection of the transmission line based on information of a low frequency component due to Brillouin scattering of the output of the optical detecting section.

Since the low frequency component of the detected returning light increases when the Brillouin scattering is generated, intensity of the returning light due to the stimulated Brillouin scattering can be detected. When the transmission line is disconnected, the returning light due to the stimulated Brillouin scattering is reduced and the low frequency component of the detected returning light is also reduced. Accordingly, disconnection of the transmission line can be detected.

According to embodiments of the present invention, a first condition and a second condition in which intensity of the light output to the transmission line is under a predetermined value are prepared. The second condition is set when disconnection of the transmission line is detected. According to embodiments of the present invention, re-opening of the transmission line is detected, in the second condition, based on information of the returning light detected with the optical detecting section. The first condition is set when the re-opening of connection is detected.

Accordingly, not only the safety standard is automatically satisfied when disconnection of the transmission line is detected, but also the ordinary condition is recovered automatically when re-opening of disconnection of the transmission line is detected.

The present invention also provides a method and apparatus which (a) transmit periodically, to the transmission line, light which alternately exhibits light of a spectrum line width which is wider than the Brillouin bandwidth and a light of a spectrum line width which is narrower than the Brillouin bandwidth, (b) detect the returning light of the transmitted light, and (c) detect disconnection of the transmission line based on the information of the detected returning light.

Since the stimulated Brillouin scattering is suppressed with the spectrum line width which is wider than the Brillouin bandwidth, the intensity of returning light differ between the light of which the spectrum line width is wider than the Brillouin bandwidth and the light of which the spectrum line width is narrower than the Brillouin bandwidth. Accordingly, a component of the stimulated Brillouin scattering can be detected from the returning light. When the transmission line is disconnected, the amount of the returning light due to the stimulated Brillouin scattering is reduced. Therefore, disconnection of the transmission line can be detected.

The present invention also provides a method and apparatus which (a) transmit light to the transmission line, (b) detect the returning light of the transmitted light, and (c) detect disconnection of the transmission based on the information of a Stokes light component of the detected returning light.

Since the Stokes light component of the detection signal of the returning light increases when the Brillouin scattering is generated, intensity of the returning light due to the Brillouin scattering can be detected. When the transmission line is disconnected, the returning light due to the stimulated Brillouin scattering is reduced and the Stokes light component of the detection signal of the returning light is also reduced. Therefore, disconnection of the transmission line can be detected.

The present invention also provides a method and apparatus which (a) transmit light to the transmission line, (b) detect the returning light of the transmitted light, and (c) detect disconnection of the transmission line based on the information of the low frequency component due to the Brillouin scattering of the detected returning light.

Since the low frequency component of the detection signal of the returning light increases when the Brillouin scattering is generated, intensity of the returning light due to the Brillouin scattering can be detected. When the transmission line is disconnected, the returning light due to the stimulated Brillouin scattering is reduced and the low frequency component of the detection signal of the returning light is also reduced. Therefore, disconnection of the transmission line can be detected.

Therefore, as indicated above, embodiments of the present invention utilize suppression of stimulated Brillouin scattering (SBS) which occurs when optical spectrum spreads wider than the Brillouin bandwidth. Disconnection of transmission line and recovery thereof can be detected by periodically transmitting light which alternately exhibits light of widened spectrum width through frequency modulation and non-modulated light, and then measuring difference based on the modulation and non-modulation of the returning light due to the SBS.

Various measurements, frequencies and other numerical values are described herein for illustration purposes. However, the present invention is not limited to any particular measurements, frequencies or numerical values.

Moreover, specific configurations are described herein for illustration purposes. However, the present invention is not limited to any specific configuration, and modifications within the scope of the invention can be made.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a detector detecting disconnection in an optical transmission line in accordance with Brillouin scattering occurring in the transmission line; and
   an optical transmitter transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein the detector detects the returning light and detects disconnection from the detected returning light.

2. An apparatus as in claim 1, wherein the detector detects disconnection in accordance with a Stokes component in the detected returning light.

3. An apparatus comprising:
   a detector detecting disconnection in an optical transmission line in accordance with Brillouin scattering occurring in the transmission line, wherein, prior to the detection of a disconnection by the detector, signal light is transmitted through the transmission line at a power level above a predetermined level;
   a controller reducing the power level of the signal light to be at or below the predetermined level when the detector detects disconnection; and
   an optical transmitter transmitting a light which alternately exhibits a spectrum line width wider than a Brillouin bandwidth and a spectrum line so that the transmitted light travels in the transmission line and thereby causes returning light to be generated in the transmission line in a reverse direction to the transmitted light in accordance with Brillouin scattering occurring in the transmission line, wherein the detector detects the returning light and detects disconnection from the detected returning light.

4. An apparatus comprising:
   a detector detecting disconnection in an optical transmission line in accordance with Brillouin scattering occurring in the transmission line, wherein, prior to the detection of a disconnection by the detector, signal light is transmitted through the transmission line at a power level above a predetermined level;
a controller reducing the power level of the signal light to be at or below the predetermined level when the detector detects disconnection;
an optical amplifier amplifying the signal light, wherein the controller controls gain of the optical amplifier to thereby control the power level of the signal light; and
an optical transmitter transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein the detector detects the returning light and detects disconnection from the detected returning light.

5. An apparatus comprising:
a detector detecting disconnection in an optical transmission line in accordance with Brillouin scattering occurring in the transmission line, wherein, prior to the detection of a disconnection by the detector, signal light is transmitted through the transmission line at a power level above a predetermined level;
a controller reducing the power level of the signal light to be at or below the predetermined level when the detector detects disconnection;
a variable optical attenuator optically attenuating the signal light, wherein the controller controls attenuation of the variable optical attenuator to thereby control the power level of the signal light; and
an optical transmitter transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein the detector detects the returning light and detects disconnection from the detected returning light.

6. A method comprising:
detecting disconnection in an optical transmission line in accordance with Brillouin scattering occurring in th transmission line; and
transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein said detecting detects the returning light and detects disconnection from the detected returning light.

7. A method as in claim 6, wherein said detection detects disconnection in accordance with a Stokes component in the detected returning light.

8. A method comprising:
detecting disconnection in an optical transmission line in accordance with Brillouin scattering occurring in the transmission line, wherein, prior to the detection of a disconnection, signal light is transmitted through the transmission line at a power level above a predetermined level;
reducing the power level of the signal light to be at or below the predetermined level when the detects disconnection; and
transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein said detecting detects the returning light and detects disconnection from the detected returning light.

9. A method comprising:
detecting disconnection in an optical transmission line in accordance with Brillouin scattering occurring in the transmission line, wherein, prior to the detection of a disconnection, signal light is transmitted through the transmission line at a power level above a predetermined level;
reducing the power level of the signal to be at or below the predetermined level when the detector detects disconnection;
amplifying the signal light with an optical amplifier, wherein said reducing controls gain of said amplifying to thereby control the power level of the signal light; and
transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein said detecting detects the returning light and detects disconnection from the detected returning light.

10. A method comprising:
detecting disconnection in an optical transmission line in accordance with Brillouin scattering occurring in the transmission line, wherein, prior to the detection of a disconnection, signal light is transmitted through the transmission line at a power level above a predetermined level;
reducing the power level of the signal light to be at or below the predetermined level when the detector detects disconnection;
optically attenuating the signal light, wherein said reducing controls attenuation of said optical attenuating to thereby control the power level of the signal light; and
transmitting a light which alternately exhibits a spectrum line width wider than a Brillouin bandwidth and a spectrum line width narrower than the Brillouin bandwidth, the transmitted light provided to the transmission line so that the transmitted light travels in the transmission line and thereby causes returning light to be generated in the transmission line in a reverse direction to the transmitted light in accordance with Brillouin scattering occurring in the transmission line, wherein said detecting detects the returning light and detects disconnection from the detected returning light.

11. An apparatus comprising:

a transmitter transmitting light which is provided to, and travels in, an optical transmission line, the transmitted light causing Brillouin scattering to occur in the transmission line, the Brillouin scattering thereby causing returning light to travel in the transmission line in a reverse direction than the light transmitted by the transmitter;

a detector detecting the returning light, and detecting disconnection in the transmission line in accordance with the detected returning light, wherein, prior to the detection of the disconnection by the detector, signal light travels through the transmission line at a power level above a predetermined level and in the same direction as the light transmitted by the transmitter; and a controller reducing the power level of the signal light to be at or below the predetermined level when the detector detects disconnection, wherein the light transmitted by the transmitter alternately exhibits a spectrum line width wider than a Brillouin bandwidth and a spectrum line width narrower than the Brillouin bandwidth, to thereby cause the Brillouin scattering to occur.

12. A apparatus comprising:

an optical transmitter transmitting a light which alternately exhibits a spectrum line width wider than a Brillouin bandwidth and a spectrum line width narrower than the Brillouin bandwidth, the transmitted light provided to an optical transmission line so that the transmitted light travels in the transmission line and thereby causes returning light to be generated in the transmission line; and an optical detecting section detecting the returning light, wherein disconnection of the transmission line is detected from the detected returning light.

13. An apparatus comprising:

means for transmitting a light which alternately exhibits a spectrum line width wider than a Brillouin bandwidth and a spectrum line width narrower than the Brillouin band width, the transmitted light provided to an optical transmission line so that the transmitted light travels in the transmission line and thereby causes returning light to be generated in the transmission line;

means for detecting the returning light; and means for detecting disconnection of the transmission line from the detected returning light.

* * * * *

UNITED STATES PATENT AND TRADEMARK OFFICE
CERTIFICATE OF CORRECTION

PATENT NO. : 7,319,816 B2  Page 1 of 1
APPLICATION NO. : 10/777706
DATED : January 15, 2008
INVENTOR(S) : Tsutomu Satou et al.

It is certified that error appears in the above-identified patent and that said Letters Patent is hereby corrected as shown below:

Column 12, Line 57, after "line" insert --width narrower than the Brillouin bandwidth, the transmitted light provided to the transmission line--.

Column 13, Line 51, change "th" to --the--.

Column 13, Line 65, change "detection" to --detecting--.

Column 14, Line 9, after "when the" insert --detector--.

Column 14, Line 29, after "signal" insert --light--.

Column 16, Line 1, change "A" to --An--.

Signed and Sealed this

First Day of July, 2008

JON W. DUDAS
*Director of the United States Patent and Trademark Office*